United States Patent [19]

Winter

[11] Patent Number: 4,946,743

[45] Date of Patent: Aug. 7, 1990

[54] NONORIENTED POLYESTER FILMS FOR LIDDING STOCK WITH MODIFIED HEAT SEAL LAYER

[75] Inventor: John P. Winter, Wauwatosa, Wis.

[73] Assignee: Reynolds Consumer Products, Inc., Appleton, Wis.

[21] Appl. No.: 258,174

[22] Filed: Oct. 14, 1988

Related U.S. Application Data

[63] Continuation-in-part of Ser. No. 67,672, Jun. 26, 1987, and Ser. No. 50,166, May 14, 1987, abandoned, which is a continuation-in-part of Ser. No. 759,391, Jul. 26, 1985, Pat. No. 4,765,999, said Ser. No. 67,672, is a continuation-in-part of Ser. No. 50,166.

[51] Int. Cl.⁵ ............................................. B32B 27/00
[52] U.S. Cl. .................................... 428/249; 428/480; 428/483
[58] Field of Search ..................... 428/483, 480, 349

[56] References Cited

U.S. PATENT DOCUMENTS

| | | | |
|---|---|---|---|
| 2,265,075 | 12/1941 | Knuetter | 93/35 |
| 2,821,337 | 1/1958 | Morgan, Jr. | 229/57 |
| 2,823,421 | 2/1958 | Scarlett | 18/57 |
| 2,978,769 | 4/1961 | Harrah | 24/201 |
| 3,003,681 | 10/1961 | Orsini | 229/57 |
| 3,017,069 | 1/1962 | Kardon et al. | 229/57 |
| 3,079,065 | 2/1963 | Kessler | 229/57 |
| 3,136,475 | 6/1964 | Geimer | 229/57 |
| 3,143,277 | 8/1964 | Fleur | 229/57 |
| 3,203,621 | 8/1965 | Wright | 229/62 |
| 3,220,635 | 11/1965 | Kasting et al. | 299/57 |
| 3,223,761 | 12/1965 | Raley | 264/95 |
| 3,277,798 | 10/1966 | Krauss | 93/35 |
| 3,337,914 | 8/1967 | Corbett et al. | 18/13 |
| 3,338,285 | 8/1967 | Jaster | 150/3 |
| 3,343,663 | 9/1967 | Seidler | 206/46 |
| 3,381,886 | 5/1968 | Goglio | 229/57 |
| 3,389,783 | 6/1968 | Bjorkengren | 206/46 |
| 3,437,258 | 4/1969 | Kugler | 229/58 |
| 3,467,565 | 9/1969 | Utz | 156/244 |
| 3,476,627 | 11/1969 | Squires | 156/244 |
| 3,534,520 | 10/1970 | Moran | 53/14 |
| 3,555,604 | 1/1971 | Pahlke | 18/14 |
| 3,558,330 | 9/1971 | Widiger et al. | 428/349 |
| 3,559,239 | 2/1972 | Work et al. | 18/12 |
| 3,611,492 | 10/1972 | Scheibling | 18/13 P |

(List continued on next page.)

FOREIGN PATENT DOCUMENTS

| | | |
|---|---|---|
| 0111179 | 6/1984 | European Pat. Off. |
| 0291065 | 11/1988 | European Pat. Off. |
| 9005187 | 1/1974 | Japan . |
| 1566422 | 4/1980 | United Kingdom . |

OTHER PUBLICATIONS

Modern Plastics Encyclopedia, vol. 48, #10A, 10/71, p. 62 plus.
Modern Packaging Encyclopedia, vol. 44 #7A, 7/71, p. 134 plus.
Eastman Plastics Technical Report TR-62, dated Oct. 1983.
Eastman Plastics Tentative Data dated Mar. 22, 1982.
Eastman Plastics Material Bulletin MB-58D, dated Mar. 1978.

*Primary Examiner*—Edith Buffalow
*Attorney, Agent, or Firm*—Willian Brinks Olds Hofer Gilson & Lione

[57] ABSTRACT

A coextruded heat sealable film made with nonoriented polyester and a heat seal layer comprising about 50% to about 80% of a copolyester and about 20% to about 50% of an olefin polymer is disclosed. In one preferred embodiment the polyester base layer includes from about 1% to about 5% of a polyolefin, LLDPE being preferred; and in another preferred embodiment the polyester base layer comprises a resin which is a nonoriented film form has a tensile strength of 7,000 psi or more. The heat sealable film can be laminated with aluminum foil, paper, etc. to form a composite which is heat sealable, useful in pouches and lidding stock. The heat seal layer using about 30% to about 40% LLDPE as the olefin polymer is particularly useful when the film is laminated to aluminum foil and heat sealed as lidding stock to crystallized CPET trays.

19 Claims, 2 Drawing Sheets

U.S. PATENT DOCUMENTS

| | | | |
|---|---|---|---|
| 3,851,574 | 12/1974 | Katz | 426/107 |
| 3,922,440 | 11/1975 | Wegwerth et al. | 428/437 |
| 3,925,591 | 12/1975 | Breitenfellner et al. | 428/349 |
| 3,973,045 | 8/1976 | Brandberg et al. | 426/110 |
| 4,046,837 | 9/1977 | Carroll, Jr. | 428/458 |
| 4,105,118 | 8/1978 | Williams, Jr. et al. | 206/524.2 |
| 4,119,479 | 10/1978 | Williams, Jr. et al. | 156/272 |
| 4,141,736 | 2/1979 | Canty | 96/87 R |
| 4,175,147 | 11/1979 | Bollen et al. | 428/35 |
| 4,178,401 | 12/1979 | Weinberg et al. | 428/35 |
| 4,188,443 | 2/1980 | Mueller et al. | 428/349 |
| 4,207,363 | 6/1980 | Lustig et al. | 428/35 |
| 4,264,662 | 4/1981 | Taylor et al. | 428/40 |
| 4,310,370 | 1/1982 | Arai | 156/220 |
| 4,316,070 | 2/1982 | Prosise et al. | 219/10.55 E |
| 4,327,174 | 4/1982 | vonMeer | 430/530 |
| 4,368,295 | 1/1983 | Newton et al. | 525/166 |
| 4,375,494 | 3/1983 | Stokes | 428/323 |
| 4,386,124 | 5/1983 | Akao | 428/35 |
| 4,389,438 | 6/1983 | Ohtsuki et al. | 428/35 |
| 4,389,450 | 6/1983 | Schaefer et al. | 428/212 |
| 4,389,472 | 1/1983 | Neuhaus | 430/10 |
| 4,393,088 | 7/1983 | Matsusaka | 426/234 |
| 4,399,182 | 8/1983 | Brown et al. | 428/215 |
| 4,403,934 | 9/1983 | Rasmussen et al. | 425/192 R |
| 4,405,547 | 9/1983 | Koch et al. | 264/171 |
| 4,421,580 | 12/1983 | Dembicki et al. | 156/69 |
| 4,421,809 | 12/1983 | Bish | 428/90 |
| 4,450,180 | 5/1984 | Watkins | 426/107 |
| 4,452,846 | 6/1984 | Akao | 428/220 |
| 4,463,121 | 7/1984 | Gartland et al. | 525/177 |
| 4,465,449 | 8/1984 | Hornbeck | 425/131.1 |
| 4,469,754 | 9/1984 | Hoh et al. | 428/476.3 |
| 4,482,593 | 11/1984 | Sagel et al. | 428/90 |
| 4,483,812 | 11/1984 | Hahn et al. | 264/171 |
| 4,484,883 | 11/1988 | Honda et al. | 425/462 |
| 4,515,840 | 5/1985 | Gatward | 428/35 |
| 4,559,266 | 12/1985 | Misasa et al. | 428/183 |
| 4,571,337 | 2/1986 | Cage et al. | 426/107 |
| 4,705,707 | 11/1987 | Winter | 428/483 |
| 4,713,269 | 12/1987 | Jabarin et al. | 428/480 |
| 4,716,061 | 12/1987 | Winter | 428/516 |

NONORIENTED POLYESTER FILMS FOR LIDDING STOCK WITH MODIFIED HEAT SEAL LAYER

CROSS REFERENCE TO RELATED APPLICATIONS

This application is a continuation-in-part of copending application Ser. No. 07/050,166, entitled, "Tough Nonoriented Polyester Films," filed May 14, 1987 now abandoned, which in turn is a continuation-in-part of application Ser. No. 06/759,391, entitled "Polyester/Copolyester Coextruded Packaging Film," filed July 26, 1985, now U.S. Pat. No. 4,765,999. This application is also a continuation-in-part of copending application Ser. No. 07/067,672, entitled Nonoriented Polyester Films For Lidding Stock, filed June 26, 1987, which in turn is also a continuation-in-part of copending application Ser. No. 07/050,166.

BACKGROUND OF THE INVENTION

The present invention relates to films made of nonoriented polyester, and more specifically to nonoriented coextruded films which further include a heat seal layer which comprises both copolyester and a polyolefin.

Biaxially oriented polyethylene terephthalate, commonly referred to as "oriented polyester" or "OPET", is a common packaging film with over 200 million lbs. used annually. OPET is used for a wide variety of packaging applications, both alone and in combination with other materials (lamination) such as snack food packaging, adhesive labels, lidding, pouches, medical device packaging, and packaging for luncheon meat, cheese, bacon, and the like.

OPET films are manufactured by an orientation process utilizing tenter frame or "double bubble" techniques. Tentering of plastic films is illustrated in U.S. Pat. No. 2,823,421 and double-bubble orientation is illustrated in U.S. Pat. No. 3,555,604. U.S. Pat. Nos. 4,141,736 and 4,207,363 describe oriented films made using the tenter and double bubble processes, respectively. The orientation process comprises the steps of (1) extruding a thick web and cooling to a solid state; (2) precise reheating of film to the "orientation" temperature, (3) stretching the film in both longitudinal and transverse directions, and (4) reheating the film to relieve internal stresses. The process of orientating polyester is very complicated, requiring very expensive equipment and several highly skilled operators.

This is in contrast to the process used to make many other commodity plastic packaging films such as polyethylene. Polyethylene film is commonly produced by blown or cast film extrusion techniques. Such films, while being easier to make, do not have the properties of toughness or stiffness which make polyester a favored packaging film for use in flexible packaging applications.

Prior to this invention and recent developments of new polyester resins, polyester film produced without orientation yielded a very brittle film of limited use in flexible packaging. Various modifications have been made to nonoriented polyester films to improve its properties. One example where the polyester is modified to improve its processability in slow cooling of thick films is disclosed in U.S. Pat. No. 4,175,147. This patent discloses single layer nonoriented films comprised of 97.5% to 99.9% w/w of PET blended with 2.5%–0.1% of polycarbonate. Such films, however, are not described as having any toughness above that of nonoriented 100% PET films of similar thicknesses and intrinsic viscosities.

Oriented polyester films often include a heat sealant layer, and are then used in many flexible packaging applications. Oriented heat sealable polyester films are commercially available whereby the heat sealant is applied as a coating. OL MYLAR and SCOTCHPAK are examples of heat sealable OPET films having the heat sealant applied as a coating. OL MYLAR is a registered trademark of E. I. DuPont de Neumours and Company. SCOTCHPAK is a registered trademark of The 3M Company.

Most heat seal coatings consist of a polymer dissolved in a solvent such as methyl ethyl ketone, toluene or ethyl acetate. The solutions are applied as a dispersion. The solvent is subsequently evaporated by passing the web through an oven. This necessitates the need for disposing of or recovering the often hazardous solvents. Furthermore, often a small amount of the solvent remains with the coating, commonly referred to as "retained solvents". Retained solvents are a concern when packaging food or medical products.

MELINEX 850 is an example of another heat sealable OPET film. MELINEX is a registered trademark of Imperial Chemical Industries, Ltd. It is believed that U.S. Pat. No. 4,375,494 discloses the method of making MELINEX B50. The film is made by coextruding a polyester base layer and a heat seal layer, orienting the coextruded layers using biaxially orientation techniques, and then heating the resulting film to a temperature below the crystalline melting point of the oriented polyester but at which the heat seal layer looses its orientation to become an amorphous heat sealable layer.

Heat seal layers are also known on nonoriented multilayer films, including PET, such as that disclosed in U.S. Pat. No. 4,389,450. This patent discloses a multiple layer heat sealable packaging sheet. The base layer (nonsealant layer) comprises a blend of 25%–75% of a polymer with coefficient of friction (COF) of less than about 2, including ethylene copolymers, polyester, polypropylene nylon. The blend also includes 25%–75% of a polymer with a COF greater than 2, including ethylene acrylic acid, ethylene methylacrylate, ethylene ethyl acrylate, ethylene vinyl acetate, and ionomer. Films made according to U.S. Pat. No. 4,389,450 containing 25% olefinic material blended into polyester do not yield the toughness of films of the present invention.

In application Ser. No. 06/759,391, the grandparent application for this case, now U.S. Pat. No. 4,765,999, a nonoriented coextruded heat sealable film is disclosed. A copolyester used in the heat seal layer was found to provide exceptional heat seal properties, especially when the film was laminated to a paper web and used to make microwave popcorn popping bags. For that use, the base polyester layer was not required to have, nor did it have, any particular toughness characteristics when made into thin films. In copending application Ser. No. 07/050,166, one of the parent applications for this case, nonoriented tough polyester films are disclosed. The coextrusion of such films with heat seal layers (as discussed below) is also disclosed. In copending application Ser. No. 07/067,672, the other parent application for this case, the use of new resins for films similar to those described in Ser. No. 07/050,166 are disclosed.

Heat sealable films are often laminated to other materials for particular applications. For example, two common means of packaging are the use of a heat sealed pouch (such as in powdered soft drink mixes) and plastic containers with a peelable lid (such as in yogurt, individual servings of jams and jellies, etc.) The pouch or lidding material is often a composite structure formed by (1) laminating printed paper or aluminum foil to oriented PET film and (2) applying a heat seal coating to the laminated structure.

The lamination is typically made by placing an adhesive layer on the paper, aluminum foil, or even the oriented PET film and then laminating the two webs of material together. Such adhesive lamination techniques are well known. An alternative to adhesive lamination is extrusion lamination whereby the webs are bonded by a polymer extruded hot onto one of the webs. Extrusion lamination techniques are also well known.

The second step in producing typical flexible packaging stocks is application of the heat sealant by means of coating. The sealant coating can be applied by dissolving a heat sealable polymer in a solvent and applying it to the surface of the laminate. The laminate is then passed through an oven to evaporate the solvent. The polymer, which does not evaporate, forms a uniform heat seal coating on the structure. A small amount of retained solvent often remains in the coating just as when a heat seal coating is applied to single layer OPET.

Besides the problem of retained solvents, such laminates are also expensive in that they use oriented films and require two converting steps to produce.

A leading candidate for a dual ovenable (convection and microwave) container for storing and cooking food products is crystallized copolyester (CPET). Trays of this material are manufactured by Mullinix Packages Incorporated, 3511 Engle Road, Fort Wayne, Ind. 46809. A lidding stock for such a tray must be heat sealable, but the heat seal strength must not be greater than internal layer strengths, such as lamination layer strengths, or the lidding stock will delaminate rather than peel off the tray.

SUMMARY OF THE INVENTION

The present invention includes a coextruded polyester film which is produced by conventional film extrusion methods and which has a heat seal layer which includes a blend of copolyester and polyolefin.

The base layer of the film is nonoriented polyester. Preferred base layers are comprised of either polyester with 1%–5% of an olefinic polymer blended therein or recently developed polyester resins, either with or without olefinic polymers blended therein. The heat sealant layer is comprised of a blend of about 50% to about 80% copolyesters and about 20% to about 50% polyolefin. The olefin used in the heat seal layer is not necessarily from the same group of olefinic polymers used as the additive in the preferred base layer.

The multiple layer heat sealable polyester films of the invention can be produced on conventional film extrusion equipment, which costs significantly less than orientation equipment and is easier and less costly to operate.

In addition, the non-oriented heat sealable coextruded polyester films of this invention demonstrate several advantages over oriented heat sealable polyester films: (1) the films of this invention can be formed into shapes by heat and/or pressure; (2) they exhibit better tear resistance; (3) they exhibit better heat seal properties; and (4) they exhibit better surface receptivity to inks, adhesives and the like. Furthermore, compared to oriented heat sealable polyester films whereby the sealant is applied as a coating, the films of this invention have the following additional advantages: (1) they can be made in one manufacturing step and (2) the sealants contain no retained solvents.

The heat sealable, non-oriented coextruded polyester films of this invention can be laminated to paper, aluminum foil, or another film to form pouch or lidding stocks. The use of the films of this invention to produce the pouch or lidding material does not require the usual step of applying a heat seal coating to a laminate of oriented PET film. Elimination of the coating step simplifies the process of making the composite structure and often reduces costs.

In addition, these composites are superior to heat sealable composites which incorporate a heat sealant applied as a solvent based coating in that they: (1) eliminate the coating step; (2) eliminate the need to handle solvents and (3) eliminate retained solvents in the heat sealant.

Further, the heat seal layer of the present invention has been found to provide a peelable bond to crystallized CPET trays which is just below the lamination bond strength of the film laminated to aluminum foil. Thus, when aluminum foil is laminated to the film and the laminate is heat sealed to CPET trays, the heat seal will peal rather than being so strongly adhered to the CPET that the aluminum foil delaminates.

DETAILED DESCRIPTION OF THE DRAWINGS AND PREFERRED EMBODIMENTS OF THE INVENTION

The films of the present invention include a nonoriented polyester base layer and a heat seal layer. The following five examples give details of various base layers and their properties. The base layer in its simplest form is a nonoriented polyester. However, preferred base layers form tough, nonoriented films which may be made of a blend of polyester containing about 1% to about 5% of a polyolefin. (Unless otherwise specified, all percentages are weight percents.) The film is between about 0.5 mil and about 5 mil thick. The following examples describe films which could be used as a base layer in coextruded films of the present invention.

EXAMPLE 1 (BACKGROUND)

A polyester polymer was extruded using the conventional chill roll cast film process. Specifically, a polyester polymer characterized by an intrinsic viscosity (IV) of 0.95 was used. The commercial polyester used was Goodyear 9506B manufactured by Goodyear Chemical Company. The polyester was placed into a 2½" diameter extruder and extruded through a coathanger style cast film die onto a chrome plated, water cooled chill roll. The resultant film was wound onto a roll using a conventional film winding system. The film had a thickness of 1.0 mil (0.001 inches).

EXAMPLE 2 (BACKGROUND)

The film of Example 1 except 1% linear low density polyethylene ("LLDPE") was blended with the polyester prior to extrusion. The LLDPE used was Dowlex 2045, manufactured by The Dow Chemical Company.

EXAMPLE 3 (BACKGROUND)

The film of Example 1 except 3% LLDPE was blended with the polyester.

EXAMPLE 4 (BACKGROUND)

The film of Example 1 except the 5% LLDPE was blended with the polyester.

EXAMPLE 5 (BACKGROUND)

The film of Example 4 except a 0.80 IV polyester was used. In particular, Goodyear 8006 was utilized. Table 1 compares the tensile strength, elongation, tear resistance and puncture resistance of the films of Examples 1–5, and of 1.0 mil OPET film.

TABLE 1

Physical Properties of the Films from Examples 1–5

| | % LLDPE in Poly-Ester | Tensile Strength ASTM D-882 | Elongation ASTM D-882 | Tear Resistance ASTM D-1922 | Puncture Resistance ASTM D-1709 |
|---|---|---|---|---|---|
| Example 1 | 0% | 5000 psi | 5% | 5 g | 40 g |
| Example 2 | 1% | 7000 psi | 200% | 30 g | 60 g |
| Example 3 | 3% | 10000 psi | 450% | 70 g | 85 g |
| Example 4 | 5% | 10000 psi | 450% | 70 g | 85 g |
| Example 5 | 3% | 6000 psi | 200% | 35 g | 55 g |
| 1.0 mil OPET | — | 29000 psi | 100% | 10 g | 300 g |

Note the surprising increase in all the physical properties when a small amount of LLDPE is added to the polyester. The poor physical properties of the film of Example 1 has limited the commercial applications of nonoriented polyester films. However, it may have utility when used as a base layer in the present invention and laminated to other material which will result in adequate toughness.

Note that beyond approximately 3% LLDPE added to the polyester, no further improvement in physical properties are realized. Also, as the amount of LLDPE goes up, the haze level of the film increases, and above about 10%, the toughness of the film begins to decrease. Therefore, levels of about 1% to about 5% are preferred.

Some copolyesters in a nonoriented state provide tougher film than comparable nonoriented polyesters. For example, Eastman 6751, a PCTA copolyester, has improved toughness over straight polyester.

Also, even in nonoriented polyesters without LLDPE, polyesters with a greater intrinsic viscosity (IV) result in films with a greater toughness. Thus, there may be nonoriented polyester films made of polyesters with an IV of 0.95 or greater and without LLDPE which will be suitable in some applications requiring moderately tough films. For example, a new Goodyear CT1006B polyester with an IV of 1.04 was found to provide, without orientation and without the use of LLDPE, a film of good toughness. Also, an article entitled "DuPont Unveils Toughened Polyester", published in *Packaging*, pp.84–87 (Jan. 1987), describes a new "Selar" polyester which reportedly may be cast into moderately tough films. The use of such resins in coextruded films is discussed below in more detail.

The addition of polyolefin has been found to surprisingly improve the toughness of polyesters of a wide variety of IV. Low IV polyesters, even when LLDPE is added, may not be tough enough for some applications. Therefore, it is thought that the addition of polyolefin will be most useful when utilizing polyesters with an IV of between about 0.7 and about .95.

The reason why small amounts of polyolefin in the polyester provides films of superior toughness is not yet fully understood. It is known, however, that in addition to LLDPE, ethylene vinyl acetate copolymers ("EVA") also provide similar improvements in the toughness of nonoriented polyester films. It is thought that the olefin acts as a nucleating agent which increases the crystallinity, hence toughness, of the extruded film. Since olefins are incompatible with polyesters, they act as sites for formation of crystalline regions. Therefore, it is believed that a wide variety of polyolefin may be blended in small amounts in polyester films and provide similar surprising results.

It has been found that recent advancements in the development of new polyester polymers by manufacturers such as Eastman Chemical, Goodyear Chemical and E. I. DuPont De Nemours have produced polyester resins which yield relatively tough films without orientation or the need to blend in a small amount of olefin. As one example, Goodyear 9506C PET was extruded with 0% and 3% LLDPE blended therein. Table 1A compares the physical properties of these films compared to conventional cast PET containing 0% olefin.

TABLE 1A

| POLYMER | % LLDPE IN POLYESTER | TENSILE STRENGTH ASTM D-882 | ELONGATION ASTM D-882 | TEAR RESISTANCE ASTM D-1922 |
|---|---|---|---|---|
| Example 1 (9506B) | 0% | 5,000 psi | 5% | 5 g |
| 9506C | 0% | 13,000 psi | 460% | 58 g |
| 9506C | 3% | 13,000 psi | 460% | 70 g |

Note that the addition of the olefin still yields improved tear resistance, an important property in many applications such as lidding stocks.

It is reported that Goodyear's 9506C resin is a TPA based high molecular weight poly(ethylene terephtalate) resin optimized for high strength and impact resistance for a Wide range of applications including industrial yarns, monofilament, strapping, and dual ovenable container applications. It is reportedly produced by a melt phase polymerization followed by a special secondary polymerization process for achieving higher purity and molecular weights.

Another example of new PET polymers which yield tough film without the addition of olefins are SELAR PT polymers manufactured by E. I. DuPont De Nemours, hereafter referred to as "DuPont." SELAR PT is a trademark of DuPont. DuPont has claimed that films produced from SELAR PT polymers yield tensile and elongation properties of 7,000 psi and 500%, respectively.

Figure 1:
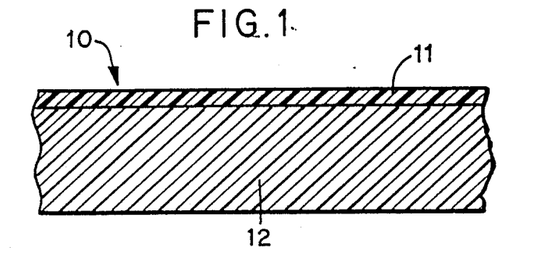
FIG. 1 shows a multilayer film including a nonoriented polyester layer and modified heat seal layer of the present invention in a two-layer "AB" structure.

The tough polyester of both types of films described above are preferred for use in the present invention, where the tough polyester is part of a coextrusion of a heat sealable film. FIG. 1 shows the structure of such a film, in which a two-layer film is generally designated 10. Layer 11 of film 10 is a heat sealant layer "A" comprising about 50% to about 80% of a copolyester and about 20% to about 50% of a polyolefin. Layer 12 of film 10 is the base layer "B" consisting of a polyester polymer, preferably either a polyester with a small amount of polyolefin blended therein or one of the new resins described above. The preferred base layer 12 provides the film with stiffness, tear resistance and toughness.

Various heat seal layers have been experimented with to find suitable heat seal layers that can be coextruded with both the polyester-polyolefin blend material as in Examples 2-5 and the new resins described thereafter. Examples 6-9 illustrate various experimental background heat sealant combinations and Example 10 illustrates a comparative heat sealant for discussing the heat seal layers of the present inventions. Tables 2-5 illustrate some of the results of the investigation with regard to these background and comparative examples.

EXAMPLE 6 (BACKGROUND)

A base layer 12 consisting of a polyester/LLDPE polymer blend of Example 3 was coextruded with a heat sealant layer 11 consisting of a modified ethylene vinyl acetate (EVA) polymer. The commercial modified EVA used in this example was Plexar 326 (commonly used as a tie layer for polyester base layers), manufactured by USI Chemicals Company. The polymer for the base layer 12 was placed into a first extruder and the polymer for the heat sealant layer 11 was placed into a second extruder and the polymers were coextruded through a feedblock and cast film die and then quenched on a chilled roll. The resultant film had a total thickness of 1.0 mil (0.001 inches), of which 0.8 mil was the base layer 12 and 0.2 mil was the heat sealant layer 11.

EXAMPLE 7 (BACKGROUND)

The film of Example 6 except a non-modified EVA was used for the heat sealant layer 11. Specifically, USI 3404, manufactured by USI Chemical Company, was used for this example.

Table 2 compares the heat seal properties of the films of Examples 6 and 7.

TABLE 2

| | Seal Strength (g/in) for Example 6 & 7 Films | | |
|---|---|---|---|
| | Film to Film | Film to Polystyrene | Film to Polypropylene |
| Example 6 | 1000 g | 800 g | 900 g |

TABLE 2-continued

| | Seal Strength (g/in) for Example 6 & 7 Films | | |
|---|---|---|---|
| | Film to Film | Film to Polystyrene | Film to Polypropylene |
| Example 7 | 600 g | 500 g | 600 g |

Note that the film using the modified EVA, Example 6, exhibits superior sealing properties compared to the non-modified EVA of Example 7. This occurs because the bond between the heat sealant layer and the base layer is weaker for the non-modified EVA of Example 7 than for the modified EVA of Example 6. When the sealed samples are peeled apart, the non-modified EVA separates from the base polyester.

Commonly known tie layers are useful for structures when the base layer is coextruded with a noncompatible layer (heat seal or otherwise). Three layer films utilizing a tie layer allow the use of heat sealant polymers which normally form a poor bond to the base polyester, and hence have poor sealing properties.

Figure 2:
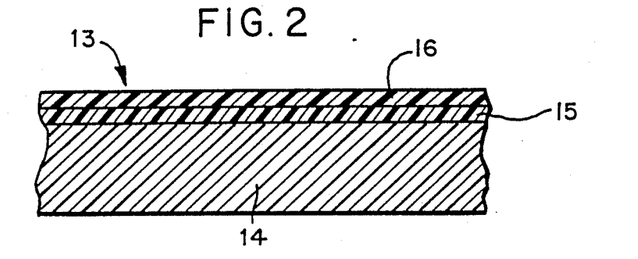
FIG. 2 shows a multilayer film of the present invention, a three-layer "ABC" structure.

For example, FIG. 2 illustrates a three-layer film generally designated 13. Layer 14 of film 13 is the base layer comparable to layer 12 of film 10 (FIG. 1). Layer 16 is a heat sealant layer comparable to layer 11 of film 10. Layer 15 is a tie layer which bonds layers 14 and 16.

The three-layer approach broadens the selection of polymers used for the heat sealant layer of films. The following examples further demonstrates this utility.

EXAMPLE 8 (BACKGROUND)

The film of Example 6 (FIG. 1) except that an ethylene - methyl acrylate (EMA) is used as the heat sealant layer 11. No tie layer is used between this heat seal layer and the base layer 12.

EXAMPLE 9 (BACKGROUND)

A base layer 14 (FIG. 2) of the polyester/LLDPE blend of Example 3 is coextruded with a tie layer 15 of a modified olefin and a heat sealant layer 16 of EMA.

The bond of the heat sealant 16 to the base layer 14 of Example 9 would be superior to that between the heat sealant 11 and the base layer 12 of the film of Example 8. This is a result of the use of tie layer 15.

The following example illustrates the use of a copolyester polymer as the heat sealant layer rather than a olefinic polymer used in the previous examples.

EXAMPLE 10 (COMPARISON)

A base layer consisting of a polyester polymer characterized by an intrinsic viscosity (IV) of 0.95 with 3% LLDPE blended therein was coextruded with a heat seal layer consisting of a copolyester. The commercial 0.95 IV polyester used in this example was Goodyear 9506B manufactured by Goodyear Chemical Company. The copolyester heat sealant layer was poly (ethylene-co-diethylene terephthalate). One commercial copolyester of this formulation is Kodabond 5116 manufactured by Eastman Chemical Products, Inc. Kodabond is a registered trademark of Eastman Chemical Products, Inc.

The use of a copolyester as the heat seal layer has advantages over the olefinic sealants of the previous examples when sealing to non-olefinic substrates, such as tubs and trays formed from polyester. To demonstrate the differences in utilizing an olefinic heat sealant versus a copolyester heat sealant, the films of Example 6, containing an olefinic heat sealant, and of Example 10, containing a copolyester heat sealant, were sealed to seven common materials used for containers. The seal strengths are listed in Table 3.

TABLE 3

| Film | Sealed to | Seal Strengths (gram/inch) Sealing Temperature (°F.) | | | | |
|---|---|---|---|---|---|---|
| | | 200 | 250 | 300 | 350 | 400 |
| Example 10 | PVC | 0 | 0 | 700 g | 1200 g | 1600 g |
| Example 6 | | 1300 g | 1800 g | 1800 g | 2000 g | 2200 g |
| Example 10 | PETG | — | 1100 g | 1500 g | 2000 g | 2500 g |
| Example 6 | | 400 g | 800 g | 900 g | 1100 g | 1400 g |
| Example 10 | High Impact | 0 | 0 | 0 | 0 | 0 |
| Example 6 | Polystyrene | — | 900 g | 1150 g | 1350 g | 1350 g |
| Example 10 | Polypropylene | 0 | 0 | 0 | 0 | 0 |
| Example 6 | | — | 200 g | 300 g | 800 g | 900 g |
| Example 10 | PVDC | — | 1300 g | 1800 g | 1800 g | 1800 g |
| Example 6 | | — | 1100 g | 1250 g | 1400 g | 1400 g |
| Example 10 | Crystallized | — | 100 g | 400 g | 1000 g | 1400 g |
| Example 6 | Polyester | 0 | 0 | 0 | 0 | 0 |
| Example 10 | High Density | 200 g | 700 g | 1050 g | 1150 g | 1250 g |
| Example 6 | Polyethylene | 0 | 0 | 0 | 0 | 0 |

Note: Seals made with 0.25" wide seal bar at 40 psi for 0.5 sec.

Note that the films of Examples 6 and 10 exhibit often widely different seal strengths to the various substrates. For example, for crystallized polyester trays, the film of Example 10 would be preferred versus the film of Example 6.

The films previously described demonstrate superior sealing properties compared to commercially available heat sealable OPET films. Table 4 compares the seal properties of the film of Example 6 to SCOTCHPAK film when sealed to high impact polystyrene ("HIPS"). Table 5 compares seal strength of the film of Example 10 compared to MELINEX 850 and OL MYLAR when sealed to crystallized polyester trays.

TABLE 4

| Film | Sealed to | Seal Strength (g/in) Sealing Temperature (°F.) | | | |
|---|---|---|---|---|---|
| | | 250 | 300 | 350 | 400 |
| Example 6 | High Impact | 1000 g | 1300 g | 1450 g | 1450 g |
| SCOTCHPAK | Polystyrene | 900 g | 1100 g | 1350 g | 1400 g |

NOTE:
Seals made with 0.25" a wide seal bar at 40 psi for 0.5 sec.

TABLE 5

| | Seal Strength (g/in) to Crystallized Polyester Sealing Temperatures | | |
|---|---|---|---|
| | 300° F. | 350° F. | 400° F. |
| MELINEX 850 | 18 g | 200 g | 300 g |
| OL MYLAR | 350 g | 350 g | 545 g |
| Example 10 | 145 g | 360 g | 1050 g |

NOTE:
Seals made with 0.25" a wide seal bar at 40 psi for 0.5 sec.

The films previously described demonstrate superior tear resistance compared to heat sealable OPET films. Table 6 compares the tear resistance of MELINEX 850 and OL MYLAR to the film Example 10 made at a thickness of 0.006".

TABLE 6

| Film | Thickness | Elmendorf Tear |
|---|---|---|
| MELINEX 850 | 0.0006" | 6 g |
| OL MYLAR | 0.0006" | 6 g |
| Example 10 | 0.0006" | 50 g |

As shown in Table 1A, the tear resistance of films made from the newly developed resins are superior to films made of conventional resins. This improved tear resistance is manifest in coextruded films comparable to the film of Example 10.

Films of the present invention differ from the heat sealable film of Example 10 in that their heat seal layers are modified. However, they have toughness and tear resistance properties comparable to the previous example films with similar base layers. Examples 11-14 give examples of films of the present invention.

EXAMPLE 11

A coextruded heat sealable film of Example 6 except that the resin for the heat seal layer 11 consisted of a blend of 70% copolyester (Eastman 5116) and 30% polyolefin (Exxon 3003.37 LLDPE 3.0 M I Hexene).

EXAMPLE 12

The film of Example 11 except that the base layer is made of the resin used for the film of Example 1.

EXAMPLE 13

The film of Example 11 except that the polyolefin used in the heat seal layer was Union Carbide 7028 LLDPE 1.0 M I Hexene.

EXAMPLE 14

The film of Example 13 except that the level of polyolefin in the heat seal layer was 40% instead of 30%.

The strength of the films of Examples 11 and 13-14 are comparable to the strength of the films of Example 6.

When using LLDPE as the polyolefin in the heat seal layer, the preferred range is between about 30% and 40% LLDPE with the remainder of the heat seal layer being copolyester. The preferred copolyester is ethylene-co-diethylene terephthalate.

While the above examples each use LLDPE as the heat seal polyolefin, other polyolefins such as polyethylene, polypropylene, EVA, modified EVA and EMA are believed to also be useful in the heat seal layer of films of the present invention. It is expected that when using EVA, modified EVA and EMA, amounts in the higher end of the range of 20-50% polyolefin will be necessary to produce the desired modification of the seal strength produced by the heat seal layer. It is expected that lesser amounts of polyethylene and polypropylene will have the desired modifying effect when those polymers are used.

Figure 3:
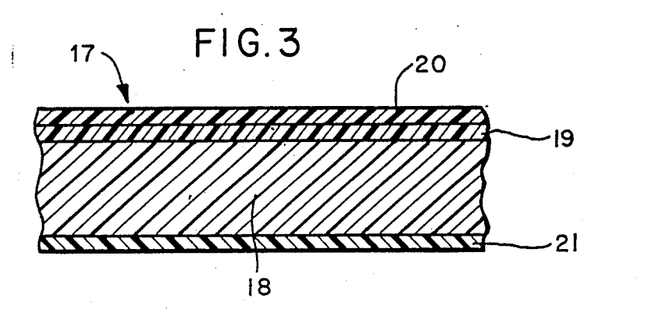
FIG. 3 illustrates a prior art flexible packaging structure comprised of an adhesive or extrusion lamination of OPET film to aluminum foil, paper or film with a heat seal coating applied to the laminate.

FIG. 3 illustrates a common construction for a flexible packaging materials generally designated by 17. The laminate 17 is made from a first web 20 laminated to a second web 18 by a lamination bonding layer 19. The lamination bonding layer 19 may be either an adhesive or an extrusion as discussed in the background section of the specification. A heat seal coating 21 is applied by solvent coating techniques, also described in the background section. The heat seal coating 21 of these common composites often contains retained solvents.

Figure 4:
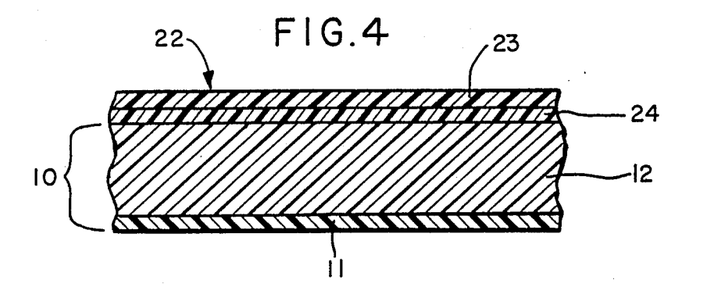
FIG. 4 shows a flexible packaging structure of the present invention comprised of an adhesive or extrusion lamination of the films of the present invention to a web of aluminum foil, paper or film.

The films of the present invention can be used to form a laminated flexible packaging stock which can replace the laminated and coated stock of FIG. 3 described above. For example, FIG. 4 illustrates a laminated stock generally referred to as 22, which is another embodiment of the present invention. Laminate 22 is comprised of first web 23 laminated to a film of this invention designated as 10 from FIG. 1. The web 23 may be aluminum foil, paper, oriented polyester, oriented polypropylene or a nonoriented polymer film. Web 23 may also consist of a multilayer structure where various functional layers are used to achieve desired characteristics in the final laminate.

The web 23 and film 10 are bonded by either adhesive or extrusion lamination techniques by lamination bonding layer 24, similar to bonding layer 19 of FIG. 3. Since film 10 already has a heat seal layer, 11, no heat seal coating step is necessary as in making structure 17.

Structure 22 has many advantages over the more conventional structure 17: (1) it can be constructed in one less manufacturing step, i.e., no heat seal coating step; (2) it can often be made at lower cost due to elimination of the coating step; and (3) the sealant layer 11 of structure 22 contains 0% retained solvents.

The following examples will serve to further describe the advantages of flexible packaging structures produced with films of the present invention (Examples 18 and 19) over similar films made without a modified heat seal layer (Examples 16 and 17) as well as films made by conventional means (Example 15).

EXAMPLE 15 (COMPARISON)

This example describes the lidstock produced by well known means and illustrated by FIG. 3. Referring to FIG. 3, aluminum foil designated as 20, of a thickness of 0.0003 inches, was first laminated to 0.00048 inch thick OPET film 18 by adhesive 19. Subsequently, ethylene vinyl acetate polymer dissolved in solvent ethyl acetate was coated onto film 18 of the laminate. The laminate was passed through an oven wherein the majority of the ethyl acetate solvent was evaporated leaving the EVA polymer as a uniform heat seal coating, 21.

EXAMPLE 16 (COMPARISON)

This example describes the manufacture of a lidding stock using the film as described in Example 6, with a structure as shown in FIG. 4. The film of Example 6 was adhesively laminated to 0.0003 inch thick aluminum foil.

EXAMPLE 17 (COMPARISON)

The structure of Example 16 except the film of Example 10 was laminated to 0.0003 inch thick aluminum foil.

EXAMPLE 18

The structure of Example 16 except the film of Example 11 is laminated to 0.0003 inch thick aluminum foil.

EXAMPLE 19

The structure of Example 16 except the film of Example 14 is laminated 0.0003 inch thick aluminum foil.

The laminate of Example 15 was analyzed by gas chromatography for the presence of the solvent ethyl acetate and found to contain 2000 mg/ream retained solvent. The films of Examples 16-19 have no retained solvents.

The cost of manufacturing the laminate of Example 15 was approximately 22% more than cost of manufacturing the laminates of Examples 16 and 17 and the expected cost of manufacturing the laminates of Examples 18 and 19.

To demonstrate the comparable functionality of the lidding stocks of Examples 15 and 16, the stocks were heat sealed to rigid high impact polystyrene (HIPS). HIPS is commonly used for the formed containers used in the packaging of jams, jellies, ketchup and other condiments and foodstuffs. Table 7 contains seal strengths data from these examples:

TABLE 7

| | Seal Peel Strength (g/in) Examples 11 & 12 to HIPS | | |
|---|---|---|---|
| | Sealing Temperature | | |
| | 300 F. | 350 F. | 400 F. |
| Example 15 | 800 | 1100 | 1500 |
| Example 16 | 1200 | 1400 | 1630 |

Note that the laminate of Example 16 yields slightly better seal properties than the laminate of Example 15. Laminates made using a base layer of the new resins described after Examples 1-5 and the heat seal layers as in Examples 16 and 17 would provide results similar to those disclosed in Table 7.

Figure 5:
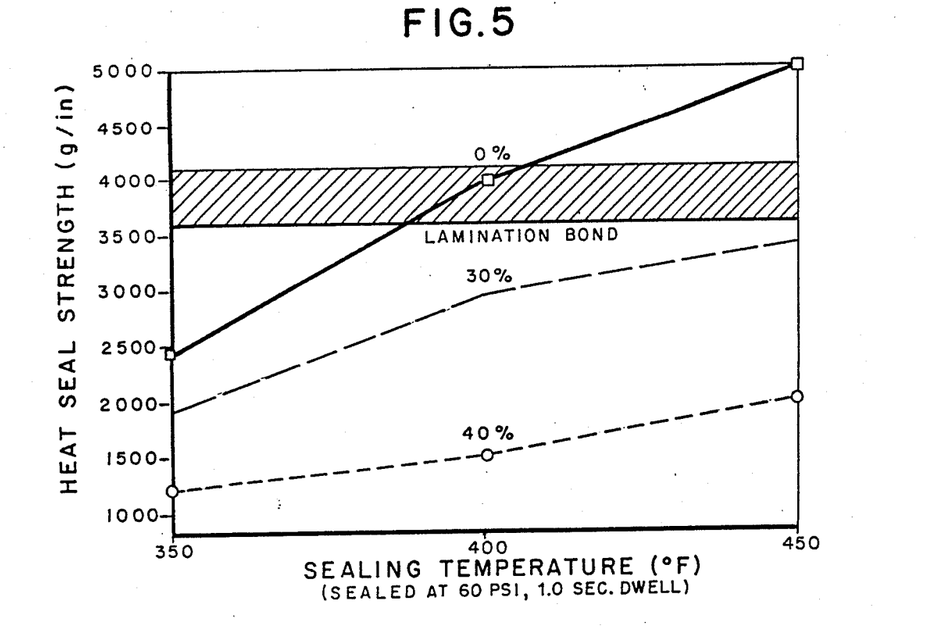
FIG. 5 shows a graph plotting seal strength of films of the present invention as a function of sealing temperature for films with heat seal layers containing different levels of polyolefin.

FIG. 5 shows the seal strength of a coextruded film with a polyester base layer and a heat seal layer containing copolyester and either 0%, 30%, or 40% of a polyolefin in the heat seal layer (as in Examples 10, 13 and 14 respectively), sealed to a one inch wide strip of material taken from a crystallized CPET tray. The seal strength of all three heat seal layers at 350° F. is adequate and desirable. However, the seal strength of the copolyester with 0% polyolefin exceeds 3600 g/in when formed by using heat sealing temperature of 400° F. and 450° F. This is undesirable because the typical bonding strength between lamination layers in films of FIG. 4 is in the range of 3600 g/in to 4100 g/in. The seal strength of the coextrusion to a CPET tray is below this lamination bond strength when 30% or 40% of a polyolefin is added to the heat seal layer.

Figure 6:
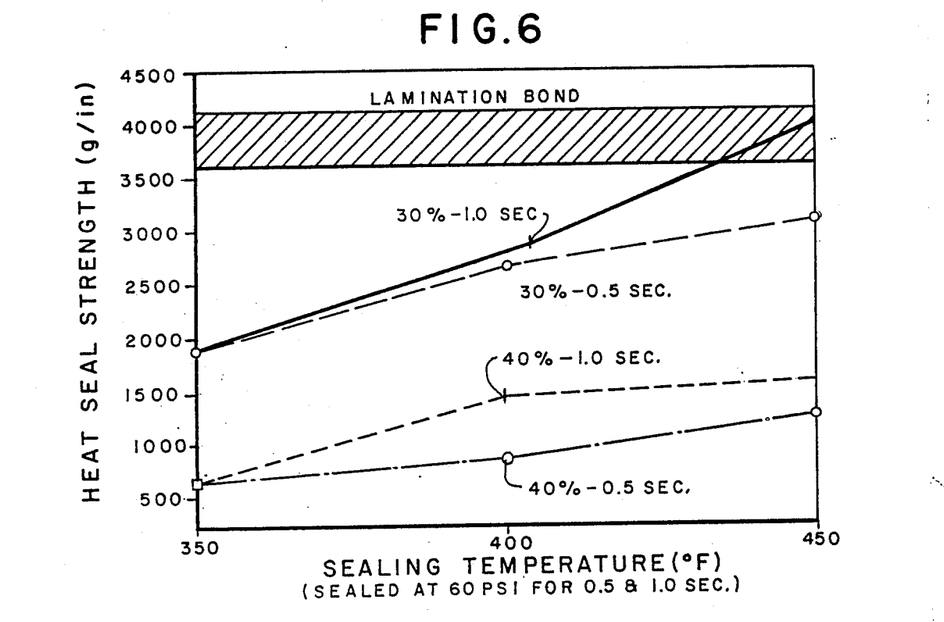
FIG. 6 shows a graph plotting seal strength of films of the present invention as a function of sealing temperature for two different sealing dwell times and for films with heat seal layers containing two different levels of polyolefin.

The seal strength of a heat seal layer to a CPET tray is dependent on dwell (length of time of applied heat) as well as temperature and pressure. The seal strengths shown in FIG. 6 exemplify the reason for utilizing various percentages of polyolefin in the heat seal layer to maintain a safe differential between the lamination bond strength and the seal strength of the heat seal layer sealed to the CPET tray. The differences in the 30% and 40% lines for 1 sec. dwell times between FIGS. 5 and 6 reflect differences in seal strength within the range of normal experimental deviation.

When a polyolefin is added to the copolyester heat seal layer, the seal strength to CPET trays is reduced at high sealing temperature so that an adequate acceptable seal is obtained. Increasing the percentage of polyolefin from 30% in Example 13 to 40% in Example 14 reduced the seal strength to within the range of 1230 g/in to 2180 g/in at sealing temperatures between 350° F. and 450° F. These lower seal strengths provide an acceptable range of seal strengths relative to a typical lamination bond strength. This lower range may be desirable because the lamination bond strength may vary even outside the typical range of 3600 g/in to 4100 g/in.

Another advantage of the films of the present invention using LLDPE as the polyolefin in the heat seal layer is that the films give a better even seal peel and leave a residue on the tray rim which is useful as a seal integrity indicator. Similar sealing advantages were found when heat sealing these films to other materials such as PET bottles and PVC containers.

The preferred embodiments of the invention disclosed herein are illustrative of the invention and are capable of variation without departing from the scope of the invention. It is intended, therefore, that the following claims, including all equivalents, define the invention.

I claim:

1. A coextruded, heat sealable, nonoriented film comprising:
   (a) a nonoriented base layer comprising polyester and
   (b) a heat seal layer comprising about 50% to about 80% copolyester and about 20% to about 50% of an olefin polymer.

2. The coextruded film of claim 1 wherein the base layer comprises a blend of polyester and a polyolefin in a ratio of polyester to polyolefin of between about 99:1 and 19:1.

3. The coextruded film of claim 2 wherein the base layer polyolefin comprises LLDPE and the ratio of polyester to LLDPE is about 97:3.

4. The coextruded film of claim 1 wherein the polyolefin in the base layer comprises ethylene vinyl acetate copolymer.

5. The coextruded film of claim 1 wherein the olefin polymer in the heat seal layer comprises LLDPE.

6. The coextruded film of claim 1 wherein the heat seal layer comprises about 60% to about 70% of a copolyester and about 30% to about 40% LLDPE.

7. The coextruded film of claim 1 wherein the heat seal copolyester comprises ethylene-co-diethylene terephthalate.

8. The coextruded film of claim 1 wherein the base layer comprises a polyester resin which in a nonoriented film form as a tensile strength of 7,000 psi or more.

9. The coextruded film of claim 1 wherein the polyester of the base layer comprises a TPA based high molecular weight PET resin with a tensile strength, in nonoriented film form, of about 13,000 psi.

10. A composite heat sealable flexible packaging material comprising:
    (a) a heat sealable, coextruded nonoriented film comprising:
       (i) a base layer comprising a nonoriented polyester; and
       (ii) a heat seal layer on one side of said base layer comprising a blend of about 50% to about 80% of a copolyester and about 20% to about 50% of an olefin polymer;
    (b) a lamination bonding layer on said base layer opposite said heat seal layer; and
    (c) a web of material laminated to said lamination bonding layer.

11. The composite of claim 10 wherein the lamination bonding layer comprises an extrusion lamination.

12. The composite of claim 10 wherein the lamination bonding layer comprises an adhesive lamination.

13. The composite of claim 10 wherein the base layer comprises a blend of polyester and a polyolefin in a ratio of polyester to polyolefin of between about 99:1 and 19:1.

14. The composite of claim 13 wherein the base layer polyolefin comprises LLDPE.

15. The composite of claim 14 wherein the ratio of the blend of polyester and LLDPE is about 97:3.

16. The composite of claim 10 wherein the olefin polymer in the heat seal layer comprises LLDPE.

17. The composite of claim 10 wherein the base layer comprises a polyester resin which in a nonoriented film form as a tensile strength of 7000 psi or more.

18. A coextruded, heat sealable, nonoriented film of between 0.5 and 5.0 mils in thickness comprising:
    (a) a tough, nonoriented base layer comprising polyester resin with an intrinsic viscosity of between about 0.70 and about 0.95 and LLDPE wherein the ratio of polyester to LLDPE is between about 99:1 and 19:1 and
    (b) a heat seal layer comprising about 60% to about 70% ethylene-co-dietheylene terephthalate and about 30% to about 40% LLDPE.

19. The composite of claim 10 wherein said web of material is selected from the group consisting of aluminum foil, paper, oriented polyester, oriented polypropylene and nonoriented polymer film.

* * * * *